US005595367A

United States Patent [19]

Sternes et al.

[11] Patent Number: 5,595,367

[45] Date of Patent: Jan. 21, 1997

[54] AUTOMATIC HOLDING DEVICE FOR GASOLINE PUMP HANDLES

[76] Inventors: Roy Sternes, 2117 Trescott Dr., Tallahassee, Fla. 32312; Mark A. Rutledge, 1565 Sprucewood Trail, Tallahassee, Fla. 32301

[21] Appl. No.: 365,083

[22] Filed: Dec. 28, 1994

[51] Int. Cl.$^6$ .................................................. F16K 35/00

[52] U.S. Cl. ................................................ 251/90; 251/89

[58] Field of Search ......................................... 251/90, 89

[56] References Cited

U.S. PATENT DOCUMENTS

| | | | |
|---|---|---|---|
| 4,201,253 | 5/1980 | Maloney | 251/90 |
| 4,287,736 | 6/1981 | Hadgis | 70/458 |
| 4,337,917 | 7/1982 | Tesack et al. | 251/90 |
| 4,683,923 | 8/1987 | Harris | 251/90 |
| 4,690,182 | 9/1987 | Knaus | 141/392 |
| 4,846,447 | 7/1989 | Hanna | 267/182 |
| 5,077,850 | 1/1992 | Brubaker | 7/151 |
| 5,118,074 | 6/1992 | Weissman | 251/90 |

FOREIGN PATENT DOCUMENTS

| | | | |
|---|---|---|---|
| 464898 | 4/1937 | United Kingdom | 251/90 |

*Primary Examiner*—A. Michael Chambers
*Attorney, Agent, or Firm*—Carnes, Cona and Dixon

[57] ABSTRACT

The present invention provides for a holding device that is used for holding and maintaining a conventional gasoline pump in an opened position. The holding device consists of a retaining mechanism and a C-shape clamp. The retaining mechanism is used to provide for the holding device to be removably secured in the proximity of the opening of the gasoline fuel line of a vehicle. The C-shape clamp includes a back portion that is attached to the retaining mechanism. This C-shape clamp further includes a pair of identical arms extending from opposite ends of the back portion. This arrangement provides for the arms of the C-shape clamp to engage the lever and handle of a gasoline fuel pump and maintain the gasoline fuel pump in an opened position.

7 Claims, 4 Drawing Sheets

AUTOMATIC HOLDING DEVICE FOR GASOLINE PUMP HANDLES

BACKGROUND OF THE INVENTION

1. Field of the Invention

The present invention relates generally to a holding device for gasoline pump handles and more particularly to a holding device for gasoline pump handles that is stored and secured within the area of the opening of a gasoline fuel line of an automobile.

2. Description of the Prior Art

Through out the United States efforts are being made to provide an easy and effortless means of using a device that will restrain the handle of a gasoline pump and maintain the gasoline pump in an opened position. This device will provide the user the freedom of using his hand to do other tasks, such as checking the oil, washing the window, or the like, and inherently decreasing his visit at the gas station.

One such restraining device is disclosed in U.S. Pat. No. 5,118,074 issued to Weissman. Weissman discloses a fuel pump lever holding device that includes a hook-shape arm structured that is used to hang over a top surface of a gas pump handle to provide for the gas pump to be in an opened position. Weissman further disclosed an aperture located thereon which is used to receive a key ring. Though this device will offer the user the liberty of using his hands to do other tasks while the gasoline is being pumped into the vehicle, the device does have a shortcoming. After utilizing the device, the patron must store this particular device in his pocket, brief case, purse, or the like, causing the pungent odor of the gasoline to linger in the vicinity of the device.

Other patents similar to Weissman include U.S. Pat. No. 5,007,850 issue to Brubaker, U.S. Pat. No. 4,690,182 issue to Knaus, U.S. Pat. No. 4,683,923 issue to Harris, and U.S. Pat. No. 4,287,736 issue to Hadgis, all disclose C-shape structures that are attached to a key ring. These devices, like Weissman's device, provide for the device to be stored within a pocket, brief case, purse, or the like, causing the pungent odor of the gasoline to linger in the vicinity of the device.

Other patents, such as U.S. Pat. No. 4,846,447 issue to Hanna and U.S. Pat. No. 4,337,917 issue to Tesack et al. disclose holding devices that encompass several components. For instance, Hanna discloses a device that includes a spring loaded clip which is used to firmly hold the trigger of a gasoline pump. Hanna is silent to the means of storing the device. Tesack et al. disclose a device that includes a pair of pivotally attached levers. These levers increase the number of components and manufacturing cost as well as increase the possibility of component failure. Tesack et al., like Hanna, is silent to the means of storing the device.

None of these previous efforts, however, provide the benefits intended with the present invention. Additionally, prior techniques do not suggest the present inventive combination of component elements as disclosed and claimed herein. The present invention achieves its intended purposes, objectives and advantages over the prior art device through a new, useful and unobvious combination of component elements, which is simple to use, with the utilization of a minimum number of functioning parts, at a reasonable cost to manufacture, assemble, test and by employing only readily available material.

SUMMARY OF THE INVENTION

The present invention provides an apparatus that is used for holding the handles for gasoline pumps and maintaining it in an opened position. The present invention consists of various preferred embodiments wherein each holding device is stored within the area of the gas cap of a vehicle. In the first embodiment, the holding device for the present invention consists of a first portion, a middle portion, and a second portion. The first portion includes the securing mechanism that will secure the device to the vehicle. This securing mechanism includes a resilient ring-like attachment that surrounds the opening of the automobile's fuel line. A C-shape clamp is affixed to the securing mechanism via an extension or cord that is located therebetween. This C-shape clamp is used to hold the handle of a gasoline pump in a fixed and opened position.

Another preferred embodiment is to provide the holding device to be secured to the lid of the gas tank. In this preferred embodiment the holding device includes a securing means. The securing means includes a first portion and a second portion. The first portion includes a cylindrical housing having an opened bottom and an enclosed top. The opened bottom receives the gasoline cap. Attached to the enclosed top is a C-shape clamp. This C-shape clamp is used to hold the handle of a gasoline pump in a fixed and opened position.

Accordingly, it is the object of the present invention to provide for a holding device that is secured to the vehicle and accessible to the gasoline pump.

It is another object of the present invention to provide for a holding device that does not affect the pumping ability of a gasoline pump.

It is yet another object of the present invention to provide for a holding device that can be universally used with any style or model gasoline pump.

Still a further object of the present invention is to provide for a holding device that maintains the gasoline odor within the vicinity of the gasoline tank.

A final object of the present invention, to be specifically enumerated herein, is to provide a holding device apparatus in accordance with the preceding objects and which will conform to conventional forms of manufacture, be of simple construction and easy to use so as to provide a device that would be economically feasible, long lasting and relatively trouble free in operation.

Although there have been many inventions related to a holding device, none of the inventions have become sufficiently compact, low cost, and reliable enough to become commonly used. The present invention meets the requirements of the simplified design, compact size, low initial cost, low operating cost, ease of installation and maintainability, and minimal amount of training to successfully employ the invention.

The foregoing has outlined some of the more pertinent objects of the invention. These objects should be construed to be merely illustrative of some of the more prominent features and application of the intended invention. Many other beneficial results can be obtained by applying the disclosed invention in a different manner or modifying the invention within the scope of the disclosure. Accordingly, a fuller understanding of the invention may be had by referring to the detailed description of the preferred embodiments in addition to the scope of the invention defined by the claims taken in conjunction with the accompanying drawings.

BRIEF DESCRIPTION OF THE DRAWINGS

Similar reference numerals refer to similar parts throughout the several views of the drawings.

DESCRIPTION OF THE PREFERRED EMBODIMENT

Figure 1A:
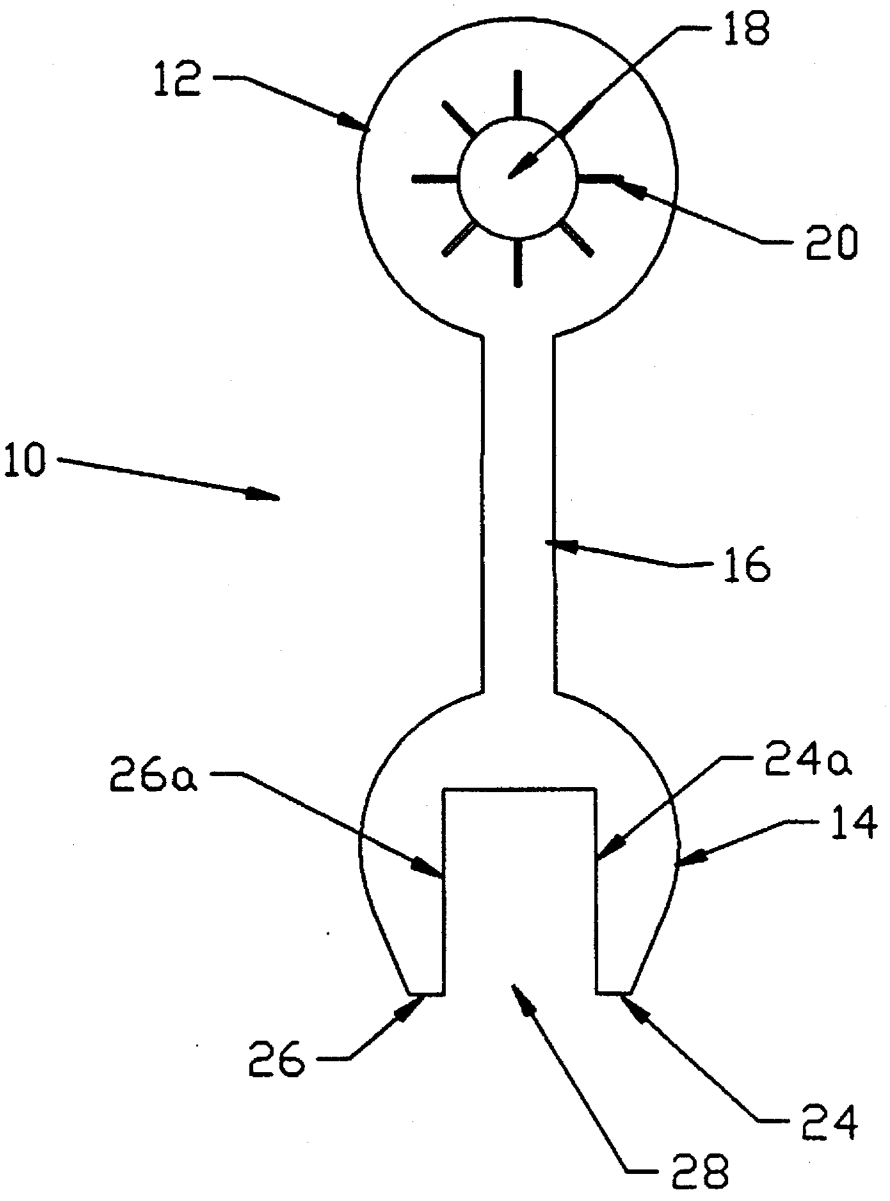
FIG. 1*a* is a front view of the first embodiment of the holding device of the present invention.
Figure 1B:
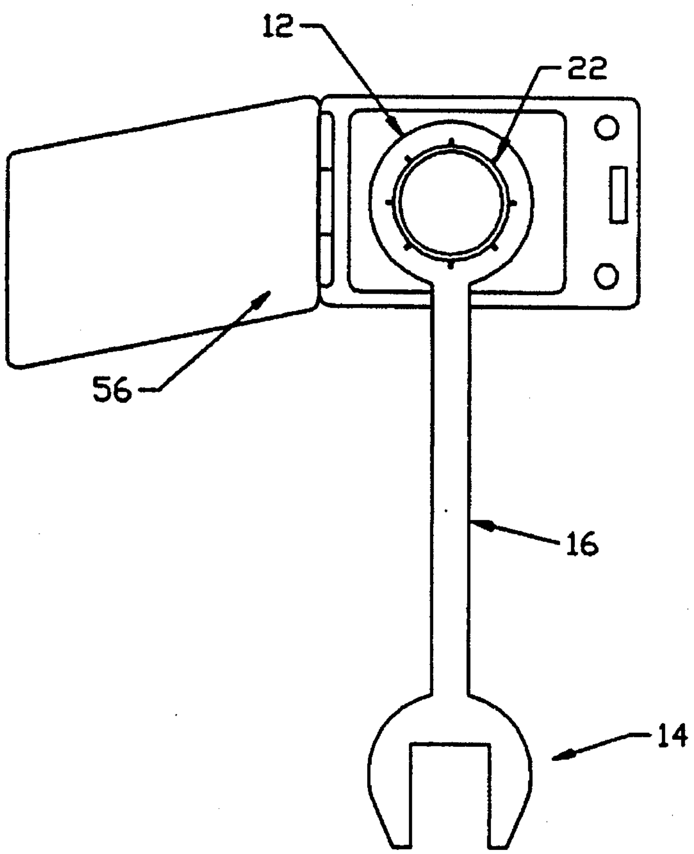
FIG. 1*b* is a front view of the first embodiment of the holding device attached to the vehicle.

FIGS. 1*a* and 1*b* illustrate the first embodiment of the present invention. As illustrated, the holding device 10 of the present invention consists of a retaining means 12 and a C-shape clamp 14. This C-shape clamp 14 is secured to the retaining means 12 via a cord 16. This cord is located between the clamp 14 and the retaining means 12.

This retaining means 12 includes a circular resilient member having a hollow center 18. A plurality of slits 20 are provided on the circular resilient member and surround the hollow center 18.

This hollow center 18 receives the end of the vehicle's gasoline tank opening 22. This will provide for the holding device 10 to be located and stored within the housing or area 56 of the vehicle that maintains and protects the opening of the fuel line for the vehicle. This arrangement and configuration will not provide the user the option of losing or mis-placing the holding device. Additionally, this device will provide the added safety feature that will render the gasoline vapors to remain within the area 56 of the gasoline tank opening and not linger around the patron or the personal property, i.e. purse, pockets, brief case, or the like, of the patron.

The slits 20 will provide for an easy attachment of the holding device 10 and well as enabling the retaining means 12 to accommodate any size opening for the fuel line.

The C-shape clamp 14 includes a first retaining arm 24 and a second retaining arm 26 with a gap 28 located therebetween. A back portion (not labeled) is attached to the first retaining arm and the second retaining arm. The gap 28 receives the handle of a gasoline pump to provide for the inner edge 24*a* of the first arm 24 and the inner edge 26*a* of the second arm 26 to engage and contact the handle and lever of the gasoline pump in order to provide for the pump to be in an opened position. This arrangement of the holding device attached to a conventional gasoline pump is illustrated in further detail in FIG. 3.

FIGS. 1*a* and 1*b* illustrate the cord 16 of the holding device 10 is integral with the retaining means 12 and with the C-shape clamp 14. This cord 16 wraps around the gasoline cap when the device is stored and not in use. This will provide for the cord 16 and the retaining means to be fabricated from a flexible, yet sturdy material such as a polymer.

The C-shape clamp 14 that is attached to the cord 16 can be altered as illustrated in the partial front view of the holding device of the present invention. As seen in this configuration, the first retaining arm 24 and the second retaining arm 26 each include an inward extending finger 29. These extending fingers 29 extends perpendicularly from the distal end of the first and second retaining arms. The use of the extending fingers will permit for the holding device to grasp, engage and firming hold the lever of the conventional gasoline pump when the holding device is utilized.

Figure 2A:
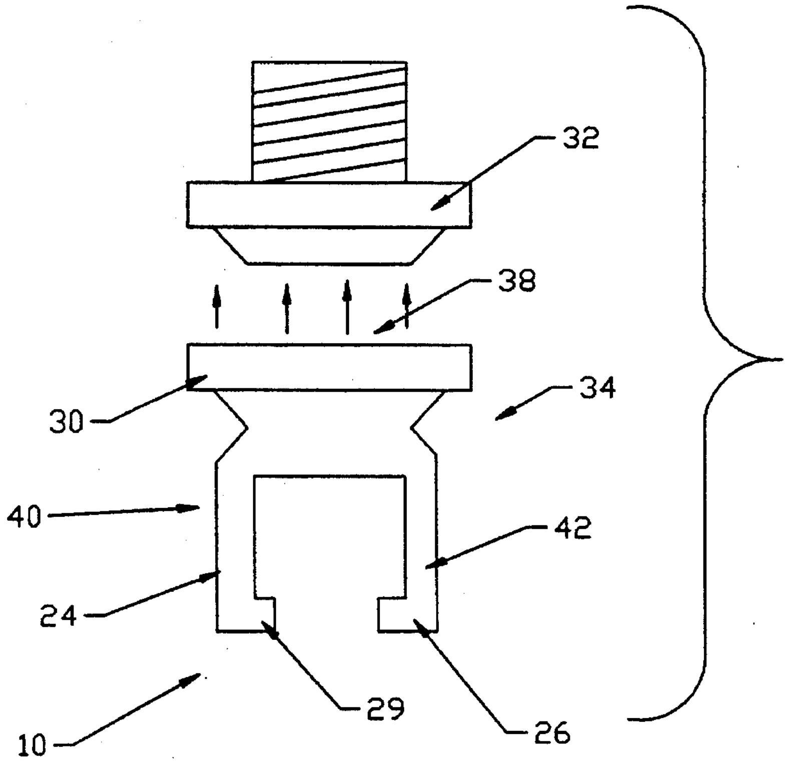
FIG. 2*a* is a front view of the second embodiment of the holding device of the present invention.
Figure 2B:
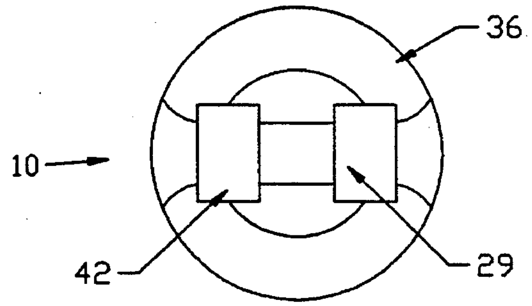
FIG. 2*b* is a top view of the second embodiment of the holding device of the present invention.

The second embodiment of the present invention is illustrated in further detail in FIGS. 2*a* and 2*b*. As seen in these figures, the hook device 10 includes a retaining means 30 to retain the device 10 onto the cap 32 of the gasoline tank of a conventional motor vehicle.

As illustrated, the retaining means 30 includes a hollow resilient body member 34 that includes an encompassing side wall 36 having an opened end 38 and an enclosed top 40. The hollow resilient body member 34 is provided with the shape and design of upper end of the gasoline cap 32. The opened end 38 of the holding device 10 receives the top area of a conventional cap 32 to provide for the device 10 to be securely fastened on the cap and inherently storing the device within the vehicle.

Figure 1C:
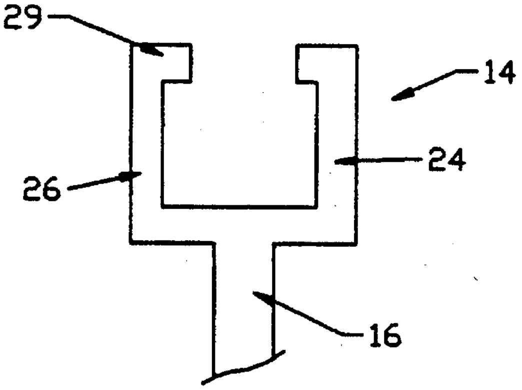
FIG. 1*c* is a front view of an alternative embodiment for the C-shape clamp used in the first embodiment of the holding device of the present invention.

Attached to the enclosed top 40 of the device 10 is a C-shape clamp 42. This C-shape clamp 42 has a first retaining arm 24 and a second retaining arm 26 having a gap 28 located therebetween. Located at each distal end of the first and second retaining arms is an extending finger The design of the C-shape clamp 42 is similar to the design discussed and illustrated in FIG. 1*c*. Accordingly, this clamp will operate and function in the same manner as discussed in FIG. 1*c*. Additionally, this C-shape clamp can be altered and designed as discussed and illustrated in FIGS. 1*a* and 1*b*.

The design and arrangement of the retaining means as illustrated in FIGS. 2*a* and 2*b* will permit for a user to remove the gasoline lid and utilized the device 10 to maintain the gasoline fluid line in an opened position.

Though not separately illustrated, the above-described invention can be altered to provide for the C-shape clamp to be integral with the gasoline cap of the conventional motor vehicle. This will provide for the C-shape clamp to be permanently attached to the upper surface of a conventional gasoline cap.

Figure 3:
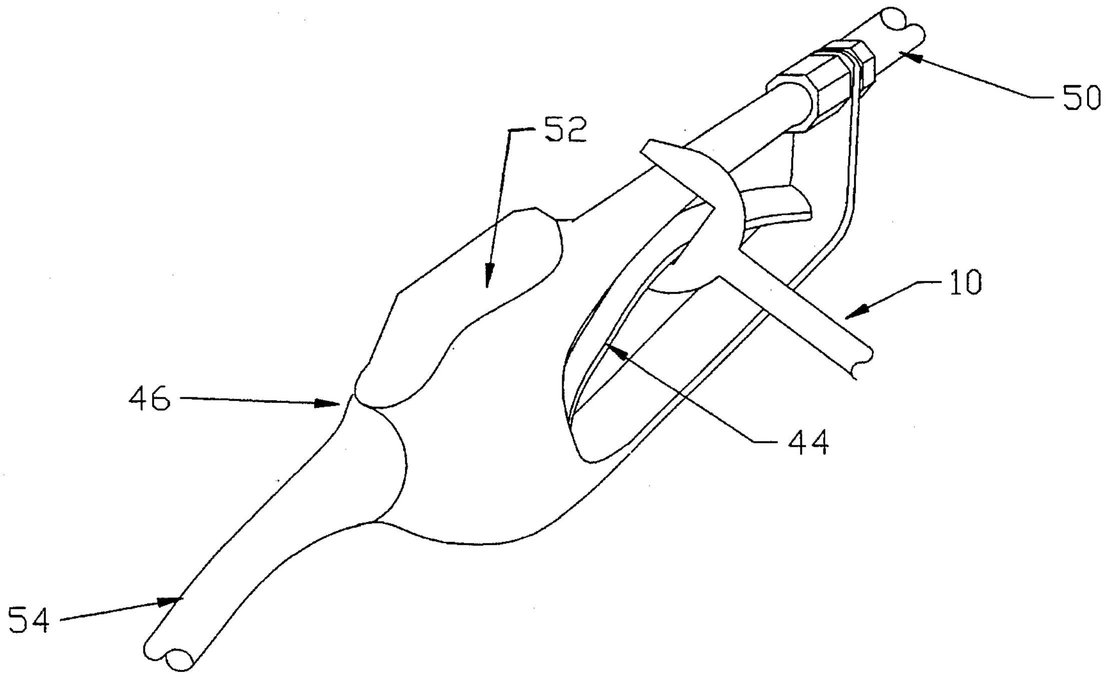
FIG. 3 is a perspective view of the clamping device of the present invention attached to the gasoline pump.

FIG. 3 illustrates the utilization of the device of the first embodiment of the present invention. As seen, a conventional gasoline dispensing pump 46 is designed to dispense gasoline from a base 50 through pipe 52 and nozzle 54 into the vehicle's gasoline tank opening 22 (illustrated in FIG. 1*b*). When the gasoline pump's motor is operating, a lever 44 is moved upwards toward the pipe 52 to open the valve in gasoline pump 46 and thereby dispense gasoline into the nozzle 54 into the vehicle's gasoline tank opening.

To use the C-shape clamp of the present invention (first or second embodiment), the lever 44 on the gasoline pump 46 is manually squeezed upwardly into the position shown in FIG. 3. When gasoline flow has been established, the C-shape clamp 10 is attached onto the gasoline pump 46. The gap receives the lever 44 and the pipe 52. This will provide for the first and second ends to contact the top surface of the pipe 52 and the lever 44, respectfully. This will provide for the device 10 to maintain the spring mechanism of the gasoline pump in an opened position.

Accordingly, the pump operator is freed of the chore of squeezing the handle to maintain the flow of gasoline into the vehicles tank. Gasoline flow will automatically cease when gasoline begins to fill up the vehicle's tank. At that time the device can be easily removed from the pump.

While the invention has been particularly shown and described with reference to an embodiment thereof, it will be understood by those skilled in the art that various changes in form and detail may be made without departing from the spirit and scope of the invention.

We claim:

1. A holding device for holding the lever of a gasoline pump dispensing handle in an opened gasoline dispensing position comprising:

a clamp and a retaining means;

said clamp includes a back portion and a pair of identical arms extending from opposite ends of said back portion;

said retaining means provides for said holding device to be attached in proximity to an opening of a fuel line of a vehicle;

a cord made of a resilient and flexible material is secured to said retaining means and said clamp; and said retaining means is a resilient member having a hollow center and said hollow center is able to engage an end of said gasoline fuel line.

2. A holding device as in claim 1 wherein said arms each include an inwardly extending finger and said inwardly extending finger is perpendicularly attached to each arm.

3. A holding device as in claim 1 wherein said clamp is integral to said cord and said cord is integral with said retaining means.

4. A holding device for holding the lever of a gasoline pump dispensing handle in an opened gasoline dispensing position comprising:

a clamp and a retaining means;

said clamp includes a back portion and a pair of identical arms extending from opposite ends of said back portion;

said retaining means provides for said holing device to be attached in proximity to an opening of a fuel line of a vehicle;

a cord is secured to said retaining means and said clamp;

said retaining means is a circular resilient member having a hollow center and a plurality of slits are provided on said circular resilient member and surround said hollow center for enabling said hollow center to receive are engage an end of said gasoline fuel line.

5. A holding device as in claim 1 wherein said arms each include an inwardly extending finger and said inwardly extending finger is perpendicularly attached to each arm.

6. A holding device for holding the lever of a gasoline pump dispensing position comprising:

a clamp and a retaining means;

said clamp includes a back portion and a pair of identical arms extending from opposite ends of said back portion;

said retaining means provides for said holding device to be attached in proximity to an opening of a fuel line of a vehicle;

said retaining means includes a hollow body shaped as a gasoline cap;

said hollow body includes an enclosed top and opened end to enable said opened end to engage and receive said gasoline cap to provide for said holding device to be securely attached to said gasoline cap; and said back portion of said claim is attached to said enclosed top of said hollow body.

7. A holding device as in claim 6 wherein said arms each include an inwardly extending finger and said inwardly extending finger is perpendicularly attached to each arm.

* * * * *